US011249288B2

(12) United States Patent
Li et al.

(10) Patent No.: US 11,249,288 B2
(45) Date of Patent: Feb. 15, 2022

(54) MOBILE TERMINAL WITH A BUILT-IN ANAMORPHIC LENS

(71) Applicant: GUANGDONG SIRUI OPTICAL CO., LTD., Zhongshan (CN)

(72) Inventors: Jie Li, Zhongshan (CN); Wei Wu, Zhongshan (CN)

(73) Assignee: GUANGDONG SIRUI OPTICAL CO., LTD., Zhongshan (CN)

(*) Notice: Subject to any disclaimer, the term of this patent is extended or adjusted under 35 U.S.C. 154(b) by 0 days.

(21) Appl. No.: 17/101,219

(22) Filed: Nov. 23, 2020

(65) Prior Publication Data
US 2021/0096340 A1  Apr. 1, 2021

Related U.S. Application Data

(63) Continuation of application No. PCT/CN2020/120801, filed on Oct. 14, 2020, and a
(Continued)

(30) Foreign Application Priority Data

Sep. 26, 2019 (CN) .......................... 201910916059.8
Nov. 27, 2019 (CN) .......................... 201911186730.4
(Continued)

(51) Int. Cl.
*G02B 3/00* (2006.01)
*G02B 13/10* (2006.01)
(Continued)

(52) U.S. Cl.
CPC ............. *G02B 13/10* (2013.01); *G03B 37/06* (2013.01); *H04M 1/0264* (2013.01); *H04M 2250/52* (2013.01)

(58) Field of Classification Search
CPC ..................................................... G02B 13/10
(Continued)

(56) References Cited

U.S. PATENT DOCUMENTS

| 2009/0195897 A1* | 8/2009 | Tsai ..................... H04N 5/2257 359/819 |
| 2019/0011679 A1* | 1/2019 | Sasaki ..................... G03B 37/06 |
| 2019/0196148 A1 | 6/2019 | Yao et al. |

FOREIGN PATENT DOCUMENTS

WO    2017174867 A1    10/2017

* cited by examiner

*Primary Examiner* — James C. Jones
(74) *Attorney, Agent, or Firm* — Loeb & Loeb LLP

(57) ABSTRACT

The present application discloses a mobile terminal with a built-in anamorphic lens, the mobile terminal is provided with a widescreen anamorphic lens which comprises a cylindrical lens group and a spherical lens group, the cylindrical lens group at least comprises a group of cylindrical negative optical power lenses and a group of cylindrical positive optical power lenses. A widescreen anamorphic lens is arranged in the mobile terminal. The optical characteristics of the cylindrical lens in the widescreen anamorphic lens are utilized to "compress" the incident light entering horizontally while keeping the incident light entering vertically unchanged, so the widescreen anamorphic lens may compress a widescreen image into a standard image area. After the compressed picture taken by the widescreen anamorphic lens is deformed and corrected by the image correction module, widescreen images and videos may be obtained, meeting the needs of users for widescreen shooting by the mobile terminal.

17 Claims, 6 Drawing Sheets

Related U.S. Application Data continuation-in-part of application No. 16/753,392, filed as application No. PCT/CN2019/128519 on Dec. 26, 2019, application No. 17/101,219, filed on Nov. 23, 2020, which is a continuation-in-part of application No. 16/753,399, filed as application No. PCT/CN2019/108977 on Sep. 29, 2019, application No. 17/101,219, which is a continuation-in-part of application No. 17/003,778, filed on Aug. 26, 2020, now Pat. No. 10,983,313, which is a continuation of application No. PCT/CN2020/101859, filed on Jul. 14, 2020, application No. 17/101,219, which is a continuation-in-part of application No. 17/003,953, filed on Aug. 26, 2020, now Pat. No. 10,969,568, which is a continuation of application No. PCT/CN2020/101864, filed on Jul. 14, 2020.

(30) Foreign Application Priority Data

| | | |
|---|---|---|
| Jul. 9, 2020 | (CN) | 202010659844.2 |
| Jul. 9, 2020 | (CN) | 202010660653.8 |
| Aug. 14, 2020 | (CN) | 202010822456.1 |
| Sep. 30, 2020 | (CN) | 202011070143.1 |

(51) Int. Cl.
*G03B 37/06* (2021.01)
*H04M 1/02* (2006.01)

(58) Field of Classification Search
USPC .......................................................... 359/664
See application file for complete search history.

MOBILE TERMINAL WITH A BUILT-IN ANAMORPHIC LENS

CROSS-REFERENCE TO RELATED APPLICATIONS

This is a US continuation application of PCT international application serial number PCT/CN2020/120801, filed on Oct. 14, 2020, which claims priority to Chinese patent applications, application number 202010822456.1, filed on Aug. 14, 2020 and application number 202011070143.1, filed on Sep. 30, 2020. All these applications are incorporated by reference in their entirety herein.

TECHNICAL FIELD

The present application relates to the technical field of mobile phone lenses, specifically to a mobile terminal with a built-in anamorphic lens.

BACKGROUND

More and more built-in cameras are applied to mobile phones. The mainstream flagship mobile phones on the market have built-in wide-angle cameras, ultra-wide-angle cameras, telephoto cameras, and macro cameras. With the development of future technology and demand, it is undoubtedly a necessity to use mobile phones to take widescreen pictures and videos conveniently and fast, which is impossible for the existing software and hardware on a mobile phone.

SUMMARY

Therefore, the technical problem to be solved by the present application is how to overcome the defect that the built-in lens on a mobile phone in prior arts cannot perform widescreen shooting function, so as to provide a mobile terminal with a built-in anamorphic lens.

In order to solve the above technical problem, the technical solution of the present application is as follows:

a mobile terminal with a built-in anamorphic lens, the mobile terminal is provided with a widescreen anamorphic lens; the widescreen anamorphic lens comprise a cylindrical lens group and a spherical lens group, the cylindrical lens group at least comprises a group of cylindrical negative optical power lenses and a group of cylindrical positive optical power lenses.

Further, the cylindrical lens group and the spherical lens group are successively arranged from an object side to an image side along an optical axis.

Further, the cylindrical lens group comprises a first lens, a second lens and a third lens successively arranged from an object side to an image side along an optical axis; the first lens and the second lens are a cylindrical negative optical power lens, and the third lens is a cylindrical positive optical power lens.

Further, the spherical lens group comprises at least four aspherical lenses.

Further, and the spherical lens group comprises a fourth lens, a fifth lens, a sixth lens and a seventh lens arranged from the object side to the image side along the optical axis; and each of the fourth lens, the fifth lens, the sixth lens and the seventh lens is an even aspheric lens.

Further, an inflection element is provided between the cylindrical lens group and the spherical lens group, and located on a light path of incident light through the cylindrical lens group, for inflecting the incident light to the spherical lens group.

Further, a mechanical center line of the cylindrical lens group is perpendicular to a mechanical center line of the spherical lens group.

Further, the inflection element is a triangular prism, a flat mirror or a pentagonal prism.

Further, the widescreen anamorphic lens has a deformation coefficient ranging from 1.33 to 2.0.

Further, the widescreen anamorphic lens has a thickness of not more than 12 mm.

Further, the widescreen anamorphic lens is built in the mobile terminal.

Further, the mobile terminal is a mobile phone or a tablet.

The technical solution of the present application has the following advantages:

1. In the mobile terminal with a built-in anamorphic lens provided by the present application, a small widescreen anamorphic lens is arranged on the mobile terminal, and the optical characteristics of the cylindrical lens group composed of at least a group of cylindrical negative optical power lenses and a group of cylindrical positive optical power lenses in the widescreen anamorphic lens are utilized to "compress" the incident light entering the cylindrical lens group horizontally while allowing the incident light entering the cylindrical lens group vertically to remain unchanged, therefore, the widescreen anamorphic lens may compress a widescreen image into a standard image area. After the compressed picture taken by the widescreen anamorphic lens is deformed and corrected by the image correction module, the mobile terminal may shoot widescreen images and videos, meeting the needs of users for widescreen shooting by the mobile terminal.

2. In the mobile terminal with a built-in anamorphic lens provided by the present application, the widescreen anamorphic lens uses the optical characteristics of the cylindrical lens group composed of three cylindrical lenses to "compress" the incident light that enters horizontally, while the incident light that enters vertically remains unchanged, then the incident light undergoes comprehensive correction by the spherical lens group, thereby increasing the field of view of the lens during horizontal shooting, so that the actual aspect ratio of a shoot screen becomes larger, realizing the function of widescreen photos and videos.

3. In the mobile terminal with a built-in anamorphic lens provided by the present application, the inflection element arranged between the cylindrical lens group and the spherical lens group of the widescreen anamorphic lens may change the direction of the light path, so that the cylindrical lens group and the spherical lens group may be arranged in a non-linear manner, such as a periscope typed "L" shape, which is conducive to installing the widescreen anamorphic lens on the mobile terminal.

BRIEF DESCRIPTION OF THE DRAWINGS

In order to more clearly describe the specific implementation of the present application or the technical solution in the prior art, drawings that need to be used in the description of the specific implementation or the prior art will be briefly introduced as follows. Obviously, the following described drawings are some implementations of the present application. For those of ordinary skill in the art, other drawings may be obtained according to these drawings without creative work.

Figure 1:
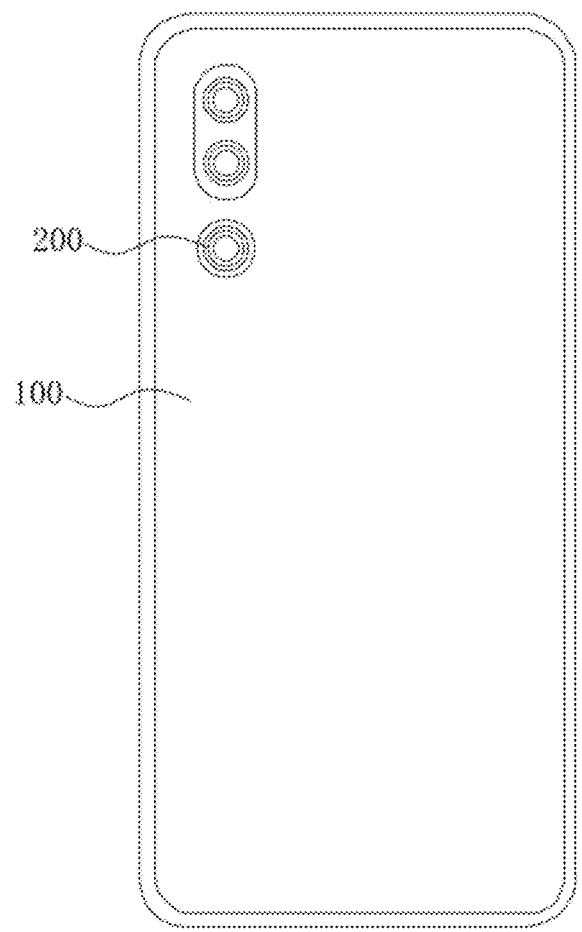
FIG. 1 is a schematic diagram of the back of a mobile phone with a widescreen anamorphic lens built therein in embodiment 1 of the present application.

Explanation for reference numerals: 100, mobile terminal; 200, widescreen anamorphic lens; 210, cylindrical lens group; 220, spherical lens group;

P1, first lens; P2, second lens; P3, third lens; PM, inflection element; P4, fourth lens; P5, fifth lens; P6, sixth lens; P7, seventh lens;

1, object side surface of first lens; 2, image side surface of first lens; 3, object side surface of second lens; 4, image side surface of second lens; 5, image side surface of third lens; 6, light incident surface of inflection element; 7, light emergent surface of inflection element; 8, object side surface of fourth lens; 9, image side surface of fourth lens; 10, diaphragm; 11, object side surface of fifth lens; 12, image side surface of fifth lens; 13, object side surface of sixth lens; 14, image side surface of sixth lens; 15, object side surface of seventh lens; 16, image side surface of seventh lens.

DETAILED DESCRIPTION

Technical solutions of the present invention will be described clearly and completely as follows in conjunction with the drawings, apparently, the described embodiments are just part rather than all embodiments of the present invention. Based on the embodiments in the present invention, all other embodiments obtained by one with ordinary skill in the art without delivering creative efforts shall fall into the protection scope of the present invention.

In the description of the present invention, it should be noted that, orientation or position relationships indicated by terms such as "centre", "upper", "lower", "left", "right", "vertical", "horizontal", "inner", "outer", etc. are orientation or position relationships indicated on the basis of the accompanying drawings, are only intended to facilitate description or simplified description of the present invention, rather than indicating or implying that the involved apparatus or element shall have specific orientations, or be configured and operated specifically, and therefore shall not be construed as limitations to the present invention. In addition, terms such as "first", "second", "third", which are merely intended to deliver description, cannot be construed as indicating or implying relative importance.

In the description of the present invention, it should be noted that, unless specified and defined otherwise, the terms of "installation", "interconnection" and "connection" shall be understood in a broad sense, for example, a fixed connection, a removable connection, an integral connection, a mechanical connection, an electrical connection, a direct connection, an indirect connection via intermediate medium, or further, internal communication between two elements. Case-by-case interpretation may be made to the above terms in the present invention by one with ordinary skill in the art.

In addition, technical features involved in the described different implementations of the present invention may be combined with each other in the case of no contradictions.

Embodiment 1

Figure 2:
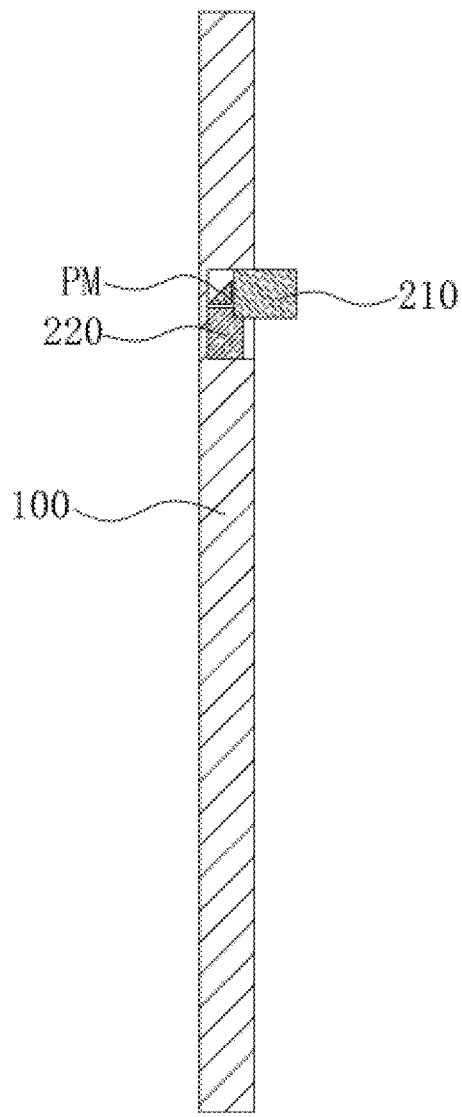
FIG. 2 is a cross-sectional view of the side of a mobile phone with a widescreen anamorphic lens built therein in embodiment 1 of the present application.

As shown in FIG. 1 and FIG. 2, a mobile terminal with a built-in anamorphic lens is illustrated, the mobile terminal 100 is equipped with a small widescreen anamorphic lens 200 which has the function of shooting squeezed and deformed images and may be installed on the mobile terminal as a built-in structure. For example, the mobile terminal 100 is provided with a groove for securing a lens module comprising a widescreen anamorphic lens as a whole in a built-in manner. In other implementations, the widescreen anamorphic lens comprising a widescreen anamorphic lens may also be connected to the mobile terminal through a rotation mechanism. The rotation mechanism may specifically be a rotation pin to which the lens module containing the widescreen anamorphic lens is rotatably connected. The lens module has at least one state of being built in the mobile terminal during the rotation. And the built-in of the lens module may be construed as all or part of the lens module extends into the mobile terminal, or after being installed on the mobile terminal, the lens module cannot be removed from the mobile terminal by methods other than a damage approach, so as to be distinguished from a lens module installed as an external structure.

Regarding the widescreen anamorphic lens, the widescreen refers to that the aspect ratio of the shooting picture is larger than the aspect ratio 16:9 of the current HDTV screen, for example, the anamorphic lens that may take pictures with an aspect ratio of 2.7:1 is a widescreen anamorphic lens. The widescreen anamorphic lens has a deformation coefficient ranging from 1.33 to 2.0, and may be, for example, 1.33, 1.5, 1.8, 2.0, etc.

Figure 3:
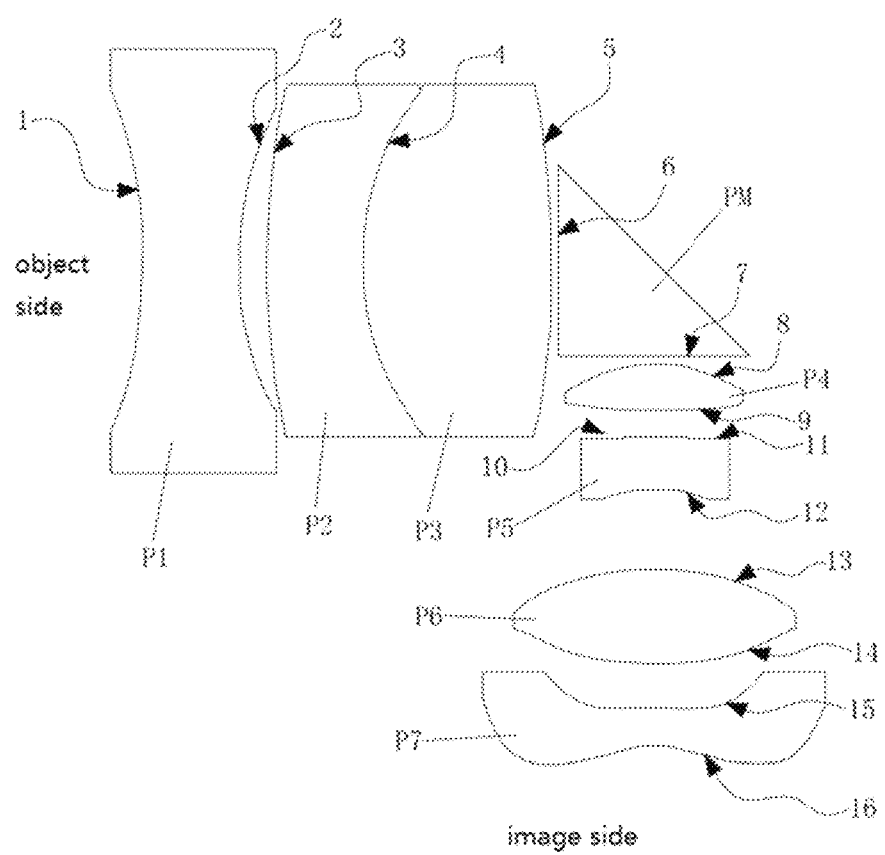
FIG. 3 is a schematic diagram of the structure of a lens group in embodiment 1 of the present application.
Figure 4:
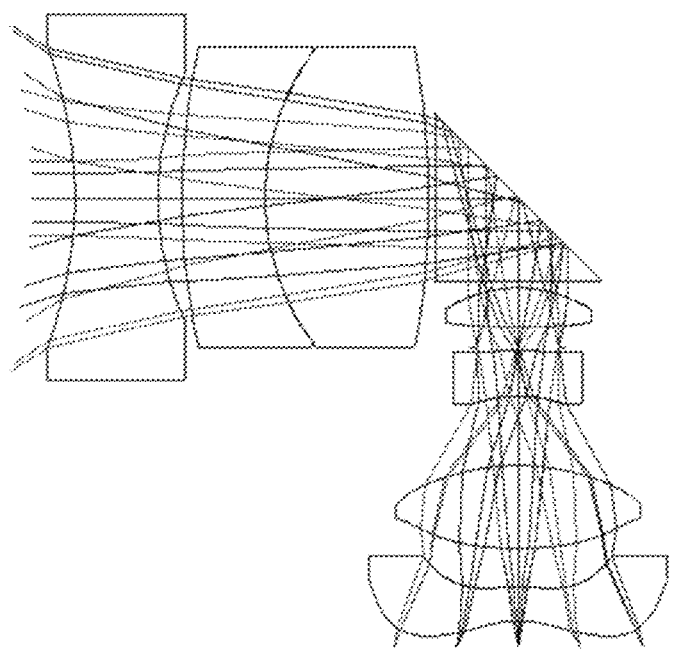
FIG. 4 is an optical path diagram of the lens group in embodiment 1 of the present application.

In conjunction with FIG. 3 and FIG. 4, in this embodiment, the widescreen anamorphic lens includes a cylindrical lens group 210, a spherical lens group 220, and an inflection element PM that are successively arranged from the object side to the image side, and the cylindrical lens group 210 at least includes a group of cylindrical negative optical power lenses and a group of cylindrical positive optical power lenses. The optical characteristics of the cylindrical lens group formed by at least a group of cylindrical negative optical power lenses and a group of cylindrical positive optical power lenses may be utilized to "compress" the incident light entering the cylindrical lens group 210 horizontally, while allowing the incident light entering the cylindrical lens group 210 vertically remain unchanged, therefore, the widescreen anamorphic lens may compress a widescreen image into a standard image area. After being deformed and corrected by the image correction module, the compressed picture taken by the widescreen anamorphic lens may be restored to obtain widescreen images and videos, meeting the needs of users for widescreen shooting by the mobile terminal.

The cylindrical lens is generally of a cylindrical or semi-cylindrical shape overall, which may be understood as a part taken from a cylindrical glass body that is cut longitudinally. The axis of the cylindrical lens is the axis of the cylindrical glass body, and the cylindrical lens includes a cylindrical face and a plane face; the cylindrical face of the cylindrical lens parallel to the axis is a parallel surface, and a circular face in the direction perpendicular to the axis. The direction in which the cylindrical lens is parallel to the axis is an axial meridian direction, and the direction in which the cylindrical lens is perpendicular to the axis is a refractive power meridian direction, and the cylindrical lens has different radii in the axial meridian direction and the refractive power meridian direction, and therefore has different magnification factors. According to this characteristic of the cylindrical lens, the incident light entering the cylindrical lens horizontally is compressed, and the incident light entering the cylindrical lens vertically remains unchanged, so wide pictures may be compressed to a standard picture area to be taken by the lens.

In this embodiment, the mobile terminal may be mobile electronic terminals such as mobile phones and tablet computers.

In this embodiment, the optical structural schematic diagram and light path diagram of the widescreen anamorphic lens are shown in FIG. 3 and FIG. 4, respectively. The widescreen anamorphic lens includes a cylindrical lens group 210, an inflection element PM, and a cylindrical lens group 220 arranged in sequence from the object side to the image side. The inflection element is located on a light path of incident light through the cylindrical lens group 210, for inflecting the incident light to the cylindrical lens group 220. A mechanical center line of the cylindrical lens group 210 is perpendicular to a mechanical center line of the spherical lens group 220. In other embodiments, the inflection element PM may also be located between combined multiple lens in the cylindrical lens group or between combined multiple lens in the spherical lens group.

In this embodiment, the cylindrical lens group is formed by three cylindrical lenses, the inflection element PM is any one of a flat mirror, a triangular prism or a pentagonal prism, and the cylindrical lens group is composed of four aspheric lenses. Images taken by the widescreen anamorphic lens in this arrangement has the visual effects of horizontal drawing and elliptical out-of-focus spots in addition to the horizontal compression and deformation effect of the picture. Horizontal drawing means that horizontally extending light is formed on the light source of a shot picture, and the thickness of the light is correlated with shooting distance, the intensity of a light source, and the deformation coefficient of the widescreen anamorphic lens. Of course, it may be understood that the number of cylindrical lenses that constitute the cylindrical lens group may also be four or more. The number of aspherical lenses constituting the spherical lens group may be more than four, as long as the cylindrical lenses constituting the cylindrical lens group may "compress" the incident light entering horizontally, while the incident light entering vertically remains unchanged. The spherical lens constituting the spherical lens group may comprehensively correct the incident light, thereby increasing the field of view during horizontal shooting by the lens, so that the actual aspect ratio of a shoot screen becomes larger, and widescreen video or photos may be obtained without sacrificing pixels.

In this embodiment, the cylindrical lens group comprises a first lens P1, a second lens P2 and a third lens P3 arranged in sequence from an object side to an image side along an optical axis; the first lens P1 and the second lens P2 are a cylindrical negative optical power lens, and the third lens P3 is a cylindrical positive optical power lens; and the spherical lens group comprises a fourth lens P4, a fifth lens P5, a sixth lens P6 and a seventh lens P7 arranged in sequence from the object side to the image side along the optical axis; and each of the fourth lens P4, the fifth lens P5, the sixth lens P6 and the seventh lens P7 is an even aspheric lens with a aspheric coefficient satisfying the following equation:

$$Z = cy^2/[1+\{1-(1+k)c^2y^2\}^{+1/2}] + A_4y^4 + A_6y^6 + A_8y^8 + A_{10}y^{10}$$

Wherein, Z is a aspheric vector height, c is a aspheric paraxial curvature, y is a lens aperture, k is a conic coefficient, A4 is a 4th power aspheric coefficient, A6 is a 6th power aspheric coefficient, and A8 is an 8th power aspheric coefficient, A10 is a 10th power aspheric coefficient.

In this embodiment, both of the object side surface and image side surface of the first lens P1 are concave near the optical axis, the object side surface of the second lens P2 is convex near the optical axis, and the image side surface of the second lens P2 is concave near the optical axis, the image side surface of the third lens P3 is convex near the optical axis. The included angle between the light incident surface of the inflection element PM and the mechanical center line of the third lens P3 is 45 degrees, the image side surface and object side surface of the fourth lens P4 are convex near the optical axis, thus the fourth lens P4 is a biconvex lens. The object side surface of the fifth lens P5 is concave near the optical axis; and the image side surface and the object side surface of the sixth lens P6 are convex near the optical axis, thus the sixth lens P6 is a biconvex lens; the object side surface of the seventh lens P7 is convex near the optical axis, and the image side surface of the seventh lens P7 is concave near the optical axis, and both its object side surface and image side surface have inflection points off-axis.

The widescreen anamorphic lens has a thickness of not more than 12 mm. In this embodiment, the thickness of the cylindrical lens group along the optical axis is 5.50 mm; the thickness of the cylindrical lens group along the optical axis is 5.20 mm; the thickness of the inflection element PM along the optical axis is 2.40 mm. The widescreen anamorphic lens has a relatively small size overall, and the mechanical center line of the cylindrical lens group is perpendicular to that of the spherical lens group, which may realize installation of the widescreen anamorphic lens on a mobile terminal with a small thickness in a built-in manner. Of course, the size of the cylindrical lens group, the cylindrical lens group and the inflection element PM may also be reduced appropriately.

The parameters of each lens in this embodiment are listed below:

| | Surface type | X_radius (mm) | Y_radius (mm) | thickness (mm) | glass |
|---|---|---|---|---|---|
| 1 | cylindrical aspheric (Toroidal Cylinder) | −5.6319 | inf | 1.2000 | 4875.704 |
| 2 | cylindrical aspheric | 4.2548 | inf | 0.3500 | |
| 3 | cylindrical (Standard Cylinder) | 10.1807 | inf | 1.200 | 8467.237 |
| 4 | cylindrical | 3.5438 | inf | 2.3500 | 9108.352 |
| 5 | cylindrical aspheric | −13.1972 | inf | 0.1000 | |
| 6 | Prism | Inf | inf | 2.400 | HK9L |
| 7 | | inf | inf | 0.1000 | |
| 8 | (Even Asphere) | 1.8974 | 1.8974 | 0.5781 | 4875.704 |
| 9 | aspheric | −6.9488 | −6.9488 | 0.2905 | |
| 10 | Stop | Inf | Inf | 0.0500 | |
| 11 | aspheric | 8.5199 | 8.5199 | 0.6503 | 7283.283 |
| 12 | aspheric | 1.8672 | 1.8672 | 1.0002 | |
| 13 | aspheric | 3.2485 | 3.2485 | 1.1911 | 5917.606 |
| 14 | aspheric | −5.4226 | −5.4226 | 0.5586 | |

-continued

| Surface | X_radius | Y_radius | thickness | |
| type | (mm) | (mm) | (mm) | glass |
|---|---|---|---|---|
| 15 aspheric | 3.6029 | 3.6029 | 0.4811 | 5917.606 |
| 16 aspheric | 1.2586 | 1.2586 | 0.4000 | |

Cylindrical Aspheric Coefficient:

1, K=−1.1411, A4=9.0e$^{-4}$, A6=6.37e$^{-5}$, A8=2.5772e$^{-6}$, A10=−7.20396e$^{-7}$;

2, K=−1.6136, A4=1.9e$^{-3}$, A6=2.00e$^{-4}$, A8=5.01650e$^{-5}$, A10=−6.30190e$^{-6}$;

5, K=−3.8613, A4=−3.0e$^{-4}$, A6=−1.00e$^{-4}$, A8=5.6852e$^{-6}$;

Aspheric Coefficient:

8, K=−0.3923, A4=8.2e$^{-3}$, A6=4.00e$^{-4}$, A8=9.000e$^{-4}$, A10=−5.400e$^{-3}$;

9, K=4.9815, A4=1.87e$^{-2}$, A6=−5.1e$^{-3}$, A8=−1.07e$^{-2}$, A10=3.60e$^{-3}$;

11, K=−4.9919, A4=−3.18e$^{-2}$, A6=5.8e$^{-3}$, A8=−1.42e$^{-2}$, A10=1.27e$^{-2}$;

12, K=−2.511, A4=4.8448e$^{-5}$, A6=1.99e$^{-2}$, A8=−5.5e$^{-3}$, A10=7.5e$^{-3}$;

13, K=0.8828, A4=−9.1e$^{-3}$, A6=7.0e$^{-4}$, A8=−7.0e$^{-4}$, A10=4.0e$^{-4}$;

14, K=1.3393, A4=−4.1e$^{-2}$, A6=2.69e$^{-2}$, A8=−1.45e$^{-2}$, A10=2.8e$^{-3}$;

15, K=4.9988, A4=−3.671e$^{-1}$, A6=1.166e$^{-1}$, A8=−1.60e$^{-2}$, A10=−4.90e$^{-3}$;

16, K=−4.8512, A4=−1.256e$^{-1}$, A6=5.34e$^{-2}$, A8=−1.22e$^{-2}$, A10=7.0e$^{-4}$;

Wherein, k is a conic coefficient, A4 is a 4th power aspheric coefficient, A6 is a 6th power aspheric coefficient, and A8 is an 8th power aspheric coefficient, A10 is a 10th power aspheric coefficient.

Figure 5:
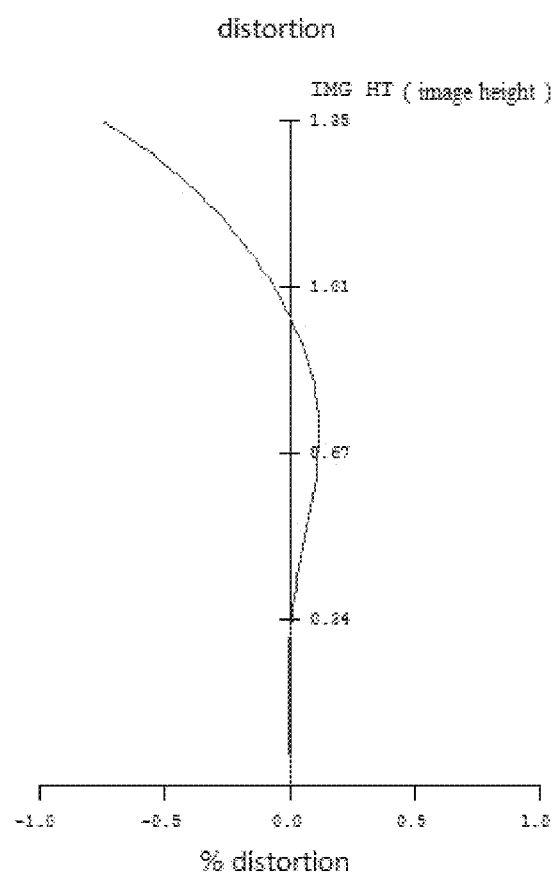
FIG. 5 is the optical distortion curve of the lens group in embodiment 1 of the present application, with the abscissa denoting a distortion percentage, and the ordinate denoting an angle of visual field.
Figure 6:
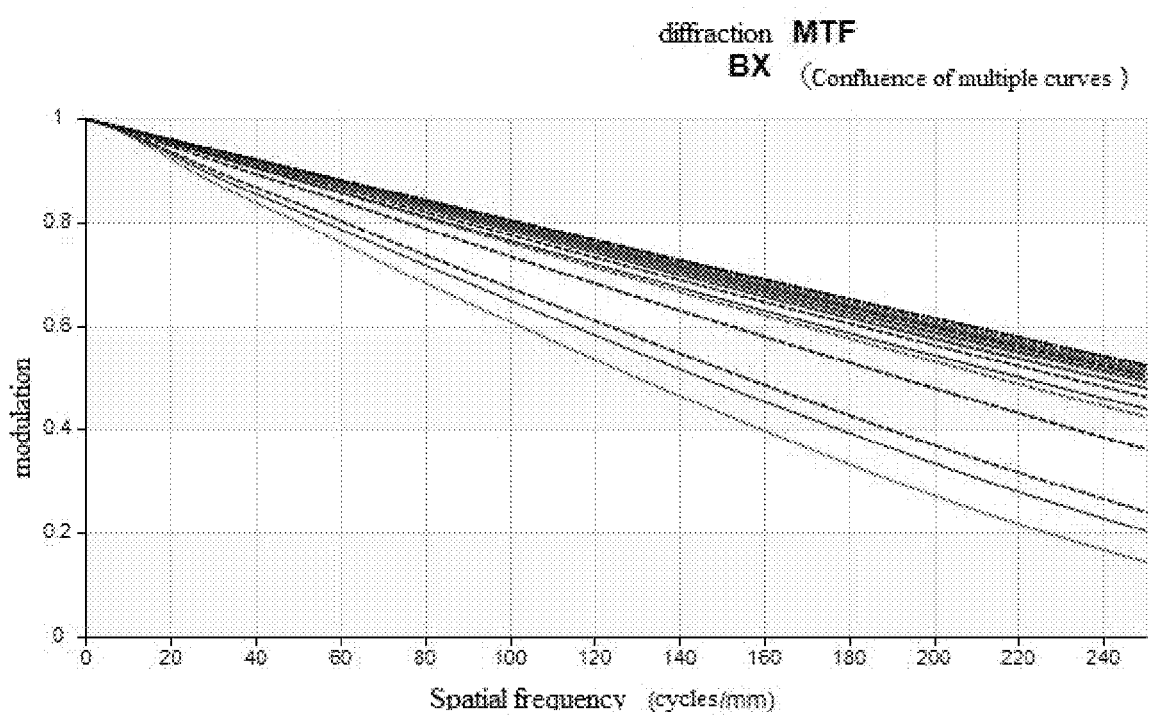
FIG. 6 is a modulation transfer function (MTF) curve of the lens group in embodiment 1 of the present application, with the abscissa denoting a spatial frequency, and the ordinate denoting an MTF value.

FIG. 5 is the optical distortion curve of the lens group in the embodiment 1; in FIG. 3, the "img Ht" refers to image height; FIG. 6 shows the MTF (Modulation Transfer Function) transfer function curve (optical transfer function) of the lens group in the embodiment 1, which may comprehensively reflect the imaging quality of the system. The smoother the curve shape and the higher the curve is relative to the X axis, the better the imaging quality of the system proves to be, and the higher the definition of the lens.

Embodiment 2

Embodiment 2 merely differs from embodiment 1 in that, positions of the cylindrical lens group and the spherical lens group are interchanged. A spherical lens group formed by four aspheric lenses serves as the front lens group, and a cylindrical lens group formed by three cylindrical lenses serves as the rear lens group; images taken by the widescreen anamorphic lens with this structure still undergo squeezing and deformation, but the pictures taken lacks the visual effect of horizontal drawing and elliptical out-of-focus spots compared with those taken by the widescreen anamorphic lens structured as embodiment 1.

Embodiment 3

Embodiment differs from embodiment 1 in that, the widescreen anamorphic lens includes two cylindrical lens groups and one spherical lens group. The first cylindrical lens group, the spherical lens group, and the second cylindrical lens group are arranged in sequence from an object side to an image side along the optical axis. This arrangement of the widescreen anamorphic lens has the effect of horizontal compression and deformation of the picture, but also has the visual effects of horizontal drawing and elliptical out-of-focus spots, and the optical effects are the same as those in embodiment 1.

Obviously, the above-mentioned embodiments are only examples for a clear description, rather than a limitation on the implementation. For those of ordinary skill in the art, other changes or modifications in different forms may be made on the basis of the above description. It is unnecessary and impossible to exhaust all implementations. And the obvious changes or modifications derived from this still fall into the protection scope of the invention.

What is claimed is:

1. A mobile terminal comprising:
a widescreen anamorphic lens as a built-in structure of the mobile terminal, wherein the widescreen anamorphic lens comprises a cylindrical lens group and a spherical lens group, the cylindrical lens group comprises at least a group of cylindrical negative optical power lenses and a group of cylindrical positive optical power lenses,
wherein the cylindrical lens group and the spherical lens group are arranged in sequence from an object side to an image side along an optical axis; and
an inflection element is disposed between the cylindrical lens group and the spherical lens group, and disposed on a light path of incident light through the cylindrical lens group, for inflecting the incident light to the spherical lens group.

2. The mobile terminal of claim 1, wherein the cylindrical lens group comprises a first lens, a second lens and a third lens arranged in sequence from an object side to an image side along an optical axis; the first lens and the second lens are a cylindrical negative optical power lens, and the third lens is a cylindrical positive optical power lens.

3. The mobile terminal of claim 1 wherein the spherical lens group comprises at least four aspherical lenses.

4. The mobile terminal of claim 3, wherein the spherical lens group comprises a fourth lens, a fifth lens, a sixth lens and a seventh lens arranged in sequence from the object side to the image side along the optical axis; and each of the fourth lens, the fifth lens, the sixth lens and the seventh lens is an even aspheric lens.

5. The mobile terminal of claim 1, wherein a mechanical center line of the cylindrical lens group is perpendicular to a mechanical center line of the spherical lens group.

6. The mobile terminal of claim 1, wherein the inflection element comprises a triangular prism, a flat mirror or a pentagonal prism.

7. The mobile terminal of claim 1, wherein the widescreen anamorphic lens has a deformation coefficient ranging from 1.33 to 2.0.

8. The mobile terminal of claim 1, wherein the widescreen anamorphic lens has a thickness of not more than 12 mm.

9. The mobile terminal of claim 1, wherein the widescreen anamorphic lens is built in the mobile terminal.

10. The mobile terminal Previously Presented of claim 1, wherein the mobile terminal is a mobile phone or a tablet.

11. The mobile terminal of claim 2, wherein the cylindrical lens group comprises a first lens, a second lens and a third lens arranged in sequence from an object side to an image side along an optical axis; the first lens and the second lens are a cylindrical negative optical power lens, and the third lens is a cylindrical positive optical power lens.

12. The mobile terminal of claim 2, wherein the spherical lens group comprises at least four aspherical lenses.

13. A mobile terminal comprising:
a widescreen anamorphic lens disposed in a housing of the mobile terminal, wherein the widescreen anamorphic lens comprises a cylindrical lens group and a spherical lens group, the cylindrical lens group comprises at least a group of cylindrical negative optical power lenses and a group of cylindrical positive optical power lenses; and
an inflection element is disposed between the cylindrical lens group and the spherical lens group and is disposed on a light path of incident light through the cylindrical lens group, for inflecting the incident light to the spherical lens group.

14. The mobile terminal of claim 13, wherein a center line of the cylindrical lens group is perpendicular to a mechanical center line of the spherical lens group.

15. The mobile terminal of claim 13, wherein the inflection element comprises a triangular prism, a flat mirror or a pentagonal prism.

16. The mobile terminal of claim 13, wherein the widescreen anamorphic lens has a deformation coefficient ranging from 1.33 to 2.0.

17. A mobile terminal comprising:
a widescreen anamorphic lens disposed in a housing of the mobile terminal, wherein the widescreen anamorphic lens and receives light through an opening of the housing and comprises a cylindrical lens group and a spherical lens group, the cylindrical lens group comprises at least a group of cylindrical negative optical power lenses and a group of cylindrical positive optical power lenses; and
an inflection element is disposed between the cylindrical lens group and the spherical lens group and is disposed on a light path of incident light through the cylindrical lens group, for inflecting the incident light to the spherical lens group, wherein the inflection element comprises one of the following: a triangular prism, a flat mirror and a pentagonal prism.

\* \* \* \* \*